(12) United States Patent
Rastgoftar

(10) Patent No.: US 12,534,231 B2
(45) Date of Patent: Jan. 27, 2026

(54) CONFIGURABLE UNMANNED AERIAL VEHICLE SYSTEM

(71) Applicant: Arizona Board of Regents on Behalf of the University of Arizona, Tucson, AZ (US)

(72) Inventor: Hossein Rastgoftar, Tucson, AZ (US)

(73) Assignee: Arizona Board of Regents on Behalf of The University of Arizona, Tucson, AZ (US)

( * ) Notice: Subject to any disclaimer, the term of this patent is extended or adjusted under 35 U.S.C. 154(b) by 63 days.

(21) Appl. No.: 18/840,833

(22) PCT Filed: Feb. 22, 2023

(86) PCT No.: PCT/US2023/013635
§ 371 (c)(1),
(2) Date: Aug. 22, 2024

(87) PCT Pub. No.: WO2023/164004
PCT Pub. Date: Aug. 31, 2023

(65) Prior Publication Data
US 2025/0171169 A1 May 29, 2025

Related U.S. Application Data

(60) Provisional application No. 63/312,602, filed on Feb. 22, 2022.

(51) Int. Cl.
*B64U 10/14* (2023.01)
*B64U 20/30* (2023.01)
*B64U 30/299* (2023.01)

(52) U.S. Cl.
CPC ............. *B64U 10/14* (2023.01); *B64U 20/30* (2023.01); *B64U 30/299* (2023.01)

(58) Field of Classification Search
CPC ...... B64U 10/14; B64U 20/30; B64U 30/299; B64U 10/60; B64U 10/13; B64U 2101/64;
(Continued)

(56) References Cited

U.S. PATENT DOCUMENTS 2,496,087 A * 1/1950 Fleming ................... B64C 37/02
292/241
2,863,618 A * 12/1958 Doyle ....................... B64D 5/00
244/2
(Continued)

OTHER PUBLICATIONS

Restas, "Drone Applications for Supporting Disaster Management", World Journal of Engineering and Technology, vol. 3, No. 03, pp. 316-321, 2015.
(Continued)

*Primary Examiner* — Medhat Badawi
(74) *Attorney, Agent, or Firm* — Grossman, Tucker, Perreault & Pfleger, PLLC; Edmund P. Pfleger

(57) ABSTRACT

The present disclosure provides an unmanned vehicle system that includes: a first non-terminal cell enclosing a first plurality of terminal cells, each of the first plurality of terminal cells enclosing a respective unmanned arial vehicle (UAV); a second non-terminal cell enclosing a second plurality of terminal cells, each of the second plurality of terminal cells enclosing a respective UAV; a first non-terminal cell linkage member fixedly coupled to the first non-terminal cell; a second non-terminal cell linkage member movably coupled to the second non-terminal cell; and a non-terminal cell pivot joint to pivotally couple the first and second non-terminal cell linkage members; wherein the first and second non-terminal cells are arranged in a single plane, and first and second non-terminal cell linkage members and the non-terminal cell pivot joint provide controllable move-
(Continued)

ment of the first and second non-terminal cells with respect to one another and within the single plane.

19 Claims, 8 Drawing Sheets

(58) Field of Classification Search
CPC ..... B64C 37/02; B64C 39/022; B64C 39/024; G05D 1/104
See application file for complete search history.

(56) References Cited

U.S. PATENT DOCUMENTS

| | | | | | |
|---|---|---|---|---|---|
| 3,008,665 | A * | 11/1961 | Piasecki | ............. | B64B 1/00 244/2 |
| 3,656,723 | A * | 4/1972 | Piasecki | ............. | B64D 1/22 244/2 |
| 4,695,012 | A * | 9/1987 | Lindenbaum | ............. | B64B 1/24 244/26 |
| 5,607,122 | A * | 3/1997 | Hicks | ............. | B64C 27/78 244/17.19 |
| 7,699,260 | B2 * | 4/2010 | Hughey | ............. | B64C 31/028 244/17.11 |
| 8,453,962 | B2 * | 6/2013 | Shaw | ............. | B64U 10/60 244/17.23 |
| 9,043,052 | B2 * | 5/2015 | So | ............. | G08G 9/00 701/3 |
| 9,079,662 | B1 * | 7/2015 | Duffy | ............. | G05D 1/695 |
| 9,205,922 | B1 * | 12/2015 | Bouwer | ............. | B64D 9/00 |
| 9,464,873 | B2 * | 10/2016 | Orlev | ............. | F42B 12/22 |
| 9,630,712 | B1 * | 4/2017 | Carmack | ............. | B64U 50/13 |
| 9,764,835 | B1 * | 9/2017 | Kimchi | ............. | B64U 30/20 |
| 9,957,045 | B1 * | 5/2018 | Daly | ............. | B64U 50/19 |
| 10,173,775 | B2 * | 1/2019 | Samaritano | ............. | B64U 20/40 |
| 10,293,936 | B1 * | 5/2019 | Conn | ............. | B64C 37/02 |
| 10,310,501 | B2 * | 6/2019 | Greenberger | ............. | H02J 7/342 |
| 10,358,214 | B2 * | 7/2019 | Zhang | ............. | B64U 20/50 |
| 10,549,850 | B1 * | 2/2020 | Ryan | ............. | B64U 20/50 |
| 10,577,098 | B2 * | 3/2020 | Chang | ............. | B64U 50/18 |
| 10,696,394 | B2 * | 6/2020 | Chang | ............. | B64U 50/13 |
| 10,712,286 | B1 * | 7/2020 | Fetzer | ............. | G01N 21/9515 |
| 10,773,799 | B1 * | 9/2020 | Thrun | ............. | B64U 10/60 |
| D898,557 | S * | 10/2020 | Chen | ............. | D8/387 |
| D899,239 | S * | 10/2020 | Schatzl | ............. | D8/387 |
| 11,104,439 | B2 * | 8/2021 | Fenny | ............. | B64U 70/30 |
| 11,117,065 | B2 * | 9/2021 | Howard | ............. | A63H 27/12 |
| 11,148,808 | B2 * | 10/2021 | Wiggerich | ............. | B64U 30/26 |
| 11,150,646 | B2 * | 10/2021 | Ivanov | ............. | G05D 1/104 |
| 11,319,064 | B1 * | 5/2022 | Wittmaak, Jr. | ............. | B64D 9/003 |
| 11,519,434 | B2 * | 12/2022 | Neiser | ............. | F03D 1/025 |
| 11,584,533 | B1 * | 2/2023 | Kimchi | ............. | B64D 31/06 |
| 11,724,804 | B2 * | 8/2023 | Mills | ............. | B64C 37/02 244/3 |
| 11,814,167 | B2 * | 11/2023 | Thrun | ............. | B64U 10/60 |
| 11,983,019 | B2 * | 5/2024 | Oshima | ............. | G05D 1/104 |
| 12,037,109 | B2 * | 7/2024 | Iñaki | ............. | B64U 10/14 |
| 12,071,228 | B1 * | 8/2024 | Nielsen | ............. | B64U 30/299 |
| 12,145,753 | B2 * | 11/2024 | Bitar | ............. | B60L 50/60 |
| 12,145,822 | B2 * | 11/2024 | Sikora | ............. | A61G 1/06 |
| 2006/0016930 | A1 * | 1/2006 | Pak | ............. | B64C 29/0033 244/12.4 |
| 2007/0023581 | A1 * | 2/2007 | La | ............. | B64U 10/16 244/165 |
| 2007/0102565 | A1 * | 5/2007 | Speer | ............. | B64U 10/20 244/2 |
| 2007/0176432 | A1 * | 8/2007 | Rolt | ............. | F03D 9/255 290/55 |
| 2009/0084890 | A1 * | 4/2009 | Reinhardt | ............. | B64C 29/0033 244/12.4 |
| 2009/0152391 | A1 * | 6/2009 | McWhirk | ............. | B64B 1/70 244/30 |
| 2009/0283629 | A1 * | 11/2009 | Kroetsch | ............. | B64U 20/40 244/17.23 |
| 2011/0266809 | A1 * | 11/2011 | Calverley | ............. | B64C 27/02 290/55 |
| 2012/0061508 | A1 * | 3/2012 | de Viry | ............. | F41G 3/145 89/41.21 |
| 2012/0158215 | A1 * | 6/2012 | Sun | ............. | B64C 37/02 701/1 |
| 2013/0287577 | A1 * | 10/2013 | Lin | ............. | B64U 30/291 416/210 R |
| 2014/0035698 | A1 * | 2/2014 | Schadler | ............. | H01Q 21/0075 333/128 |
| 2014/0374532 | A1 * | 12/2014 | Duffy | ............. | G05D 1/104 244/2 |
| 2015/0120126 | A1 * | 4/2015 | So | ............. | G05D 1/104 701/26 |
| 2016/0159471 | A1 * | 6/2016 | Chan | ............. | B64D 27/40 244/39 |
| 2016/0229530 | A1 * | 8/2016 | Welsh | ............. | B64U 30/24 |
| 2016/0311526 | A1 * | 10/2016 | Geise | ............. | B64C 27/14 |
| 2016/0318607 | A1 * | 11/2016 | Desai | ............. | A01M 7/00 |
| 2016/0340021 | A1 * | 11/2016 | Zhang | ............. | B64C 27/006 |
| 2016/0340028 | A1 * | 11/2016 | Datta | ............. | B64U 30/293 |
| 2016/0378108 | A1 * | 12/2016 | Paczan | ............. | B64U 30/20 705/330 |
| 2017/0036762 | A1 * | 2/2017 | Gamble | ............. | B64U 70/20 |
| 2017/0036777 | A1 * | 2/2017 | Martin | ............. | B64U 30/26 |
| 2017/0085840 | A1 * | 3/2017 | Mizushina | ............. | H04N 23/57 |
| 2017/0144754 | A1 * | 5/2017 | Limvorapun | ............. | B64U 50/34 |
| 2017/0197718 | A1 * | 7/2017 | Buchmueller | ............. | G05D 1/0204 |
| 2017/0217571 | A1 * | 8/2017 | Deng | ............. | B64U 30/293 |
| 2017/0225784 | A1 * | 8/2017 | Hayes | ............. | B63B 21/50 |
| 2017/0291704 | A1 * | 10/2017 | Alegria | ............. | G08G 5/55 |
| 2017/0313418 | A1 * | 11/2017 | Yoon | ............. | B64U 30/26 |
| 2017/0316701 | A1 * | 11/2017 | Gil | ............. | B60P 3/11 |
| 2017/0320569 | A1 * | 11/2017 | Gordon | ............. | B60L 53/80 |
| 2017/0341725 | A1 * | 11/2017 | Skahan | ............. | B64C 25/54 |
| 2017/0350435 | A1 * | 12/2017 | Chen | ............. | F16B 33/008 |
| 2018/0029703 | A1 * | 2/2018 | Simon | ............. | B64U 30/26 |
| 2018/0032089 | A1 * | 2/2018 | Vander Lind | ............. | G05D 1/0204 |
| 2018/0148169 | A1 * | 5/2018 | Zhang | ............. | B64U 50/18 |
| 2018/0186450 | A1 * | 7/2018 | Chang | ............. | B64U 50/13 |
| 2018/0194463 | A1 * | 7/2018 | Hasinski | ............. | B64U 30/20 |
| 2018/0196418 | A1 * | 7/2018 | Meier | ............. | G05D 1/0206 |
| 2018/0257774 | A1 * | 9/2018 | Volpi | ............. | B64D 47/00 |
| 2018/0326441 | A1 * | 11/2018 | Liu | ............. | B05B 13/005 |
| 2019/0016476 | A1 * | 1/2019 | Scherz | ............. | H02J 7/0042 |
| 2019/0160315 | A1 * | 5/2019 | Head | ............. | G05D 1/104 |
| 2019/0217952 | A1 * | 7/2019 | Zawadzki | ............. | B64D 1/02 |
| 2019/0245365 | A1 * | 8/2019 | Farrahi Moghaddam | ............. | H02J 7/0042 |
| 2019/0276140 | A1 * | 9/2019 | Poltorak | ............. | B64U 50/19 |
| 2019/0283871 | A1 * | 9/2019 | Wieczorek | ............. | B64U 10/60 |
| 2019/0300150 | A1 * | 10/2019 | O'Brien | ............. | B64U 10/14 |
| 2019/0344770 | A1 * | 11/2019 | Cha | ............. | B60V 3/025 |
| 2020/0033851 | A1 * | 1/2020 | Hajimiri | ............. | B64C 39/04 |
| 2020/0122830 | A1 * | 4/2020 | Anderson | ............. | B60L 50/60 |
| 2020/0150693 | A1 * | 5/2020 | Tomonaga | ............. | B64C 37/02 |
| 2020/0207469 | A1 * | 7/2020 | Benedict | ............. | B64U 30/297 |
| 2020/0269978 | A1 * | 8/2020 | Wang | ............. | B64U 10/14 |
| 2020/0291979 | A1 * | 9/2020 | Cowles, Jr. | ............. | F16B 33/06 |
| 2020/0324893 | A1 * | 10/2020 | Mills | ............. | B64C 37/02 |
| 2020/0369382 | A1 * | 11/2020 | Thrun | ............. | B64C 37/02 |
| 2021/0064062 | A1 * | 3/2021 | Katayama | ............. | B64C 29/0025 |
| 2021/0237381 | A1 * | 8/2021 | Hafenrichter | ............. | B29C 73/12 |
| 2021/0237606 | A1 * | 8/2021 | McNair | ............. | B64D 41/00 |
| 2021/0237901 | A1 * | 8/2021 | von Flotow | ............. | B64F 1/0295 |
| 2022/0001976 | A1 * | 1/2022 | Iñaki | ............. | B64C 27/20 |
| 2022/0048618 | A1 * | 2/2022 | Morris | ............. | B64C 11/46 |
| 2024/0181825 | A1 * | 6/2024 | Rocha | ............. | B64U 30/297 |
| 2024/0210956 | A1 * | 6/2024 | Barawkar | ............. | G05D 1/2287 |
| 2024/0262543 | A1 * | 8/2024 | Howe | ............. | B64U 70/50 |
| 2024/0353835 | A1 * | 10/2024 | Gurgul | ............. | G06V 20/56 |
| 2024/0377286 | A1 * | 11/2024 | Fang | ............. | B64U 30/299 |

(56) References Cited

U.S. PATENT DOCUMENTS

| | | | |
|---|---|---|---|
| 2024/0409214 A1* | 12/2024 | Nord | B64U 50/19 |
| 2025/0019096 A1* | 1/2025 | Mayounove | B64U 10/14 |

OTHER PUBLICATIONS

Estrada, et al., "The Uses of Unmanned Aerial Vehicles-UAV's-(or Drones) in Social Logistic: Natural Disasters Response and Humanitarian Relief Aid", Procedia Computer Science, vol. 149, pp. 375-383, 2019.

Daponte, et al., "Measurement Science and Education in the Drone Times", in 2017 IEEE International Instrumentation and Measurement Technology Conference (I2MTC). IEEE, 2017, pp. 1-6.

Bermúdez, et al., "Drone Challenge: A Platform for Promoting Programming and Robotics Skills in K-12 Education", International Journal of Advanced Robotic Systems, vol. 16, No. 1, pp. 1-19, 2019.

Lottes, et al., "UAV-Based Crop and Weed Classification for Smart Farming", in 2017 IEEE International Conference on Robotics and Automation (ICRA). IEEE, 2017, pp. 3024-3031.

Puri, et al., "Agriculture Drones: A Modern Breakthrough in Precision Agriculture", Journal of Statistics and Management Systems, vol. 20, No. 4, pp. 507-518, 2017.

Wall, et al., "Surveillance and Violence from Afar: The Politics of Drones and Liminal Security-Scapes", Theoretical Criminology, vol. 15, No. 3, pp. 239-254, 2011.

Thompson, "Drones in Domestic Surveillance Operations: Fourth Amendment Implications and Legislative Responses", Congressional Research Service, Library of Congress, pp. 1-21, 2013.

Scott, et al., "Drone Delivery Models for Healthcare", Proceedings of the 50th Hawaii international Conference on System Sciences, pp. 3297-3304, 2017.

Amukele, et al., "Drone Transportation of Blood Products", Transfusion, vol. 57, No. 3, pp. 582-588, 2017.

Chowdhury, et al., "Drones for Disaster Response and Relief Operations: A Continuous Approximation Model", International Journal of Production Economics, vol. 188, pp. 167-184, 2017.

Erdelj, et al., "Wireless Sensor Networks and Multi-UAV Systems for Natural Disaster Management", Computer Networks, vol. 124, pp. 72-86, 2017.

Pounds, et al., "Stability of Small-Scale UAV Helicopters and Quadrotors with Added Payload Mass Under PID Control", Autonomous Robots, vol. 33, No. 1-2, pp. 129-142, 2012.

Bernard, et al., "Generic Slung Load Transportation System Using Small Size Helicopters", IEEE International Conference on Robotics and Automation, 2009, pp. 3258-3264.

Oh, et al, "Dynamics and Control of a Helicopter Carrying a Payload Using a Cable-Suspended Robot", Journal of Mechanical Design, vol. 128, pp. 1113-1121, 2006.

Rastgoftar, et al. "Cooperative Aerial Lift and Manipulation (CALM)", Aerospace Science and Technology 82-83, pp. 105-118, 2018.

Acosta, et al., "Accurate Control of Aerial Manipulators Outdoors. A Reliable and Self-Coordinated Nonlinear Approach", Aerospace Science and Technology, vol. 99 pp. 1-14, 2020.

Guerrero, et al., "Passivity Based Control for a Quadrotor UAV Transporting a Cable-Suspended Payload with Minimum Swing", in 2015 IEEE 54th Annual Conference on Decision and Control (CDC). 2015, pp. 6718-6723.

Palunko, et al., "Trajectory Generation for Swing-Free Maneuvers of a Quadrotor with Suspended Payload: A Dynamic Programming Approach", 2012 IEEE International Conference on Robotics and Automation (ICRA), 2012, pp. 2691-2697.

Kim, et al., "Aerial Manipulation Using a Quadrotor with A Two DOF Robotic Arm", 2013 IEEE/RSJ International Conference on Intelligent Robots and Systems (IROS), 2013, pp. 4990-4995.

Guo, et al., "Mixed H2/H Tracking Control with Constraints for Single Quadcopter Carrying a Cable-Suspended Payload", IFAC-PapersOnLine, vol. 50, No. 1, 2017, pp. 4869-4874.

Goodarzi, et al., "Autonomous Aerial Payload Delivery with Quadrotor Using Varying Length Cable", International Conference on Advanced Mechatronic Systems, 2016, pp. 394-399.

Xian, et al., "Nonlinear Adaptive Control for an Unmanned Aerial Payload Transportation System: Theory and Experimental Validation", Nonlinear Dynamics, vol. 98, No. 3, pp. 1745-1760, 2019.

Goodarzi, et al., "Geometric Adaptive Tracking Control of a Quadrotor Unmanned Aerial Vehicle on SE(3) for Agile Maneuvers", Journal of Dynamic Systems, Measurement, and Control, vol. 137, No. 9, pp. 091007-1-091007-12, 2015.

Sreenath, et al., "Geometric Control and Differential Flatness of a Quadrotor UAV with A Cable-Suspended Load", in Decision and Control Conference. IEEE, 2013, pp. 2269-2274.

Ichikawa, et al., "Dynamics and Command Shaping Control of Quadcopters Carrying Suspended Loads", IFAC—PapersOnLine, vol. 51, No. 14, pp. 84-88, 2018.

Barawkar, et al., "Admittance Based Force Control for Collaborative Transportation of a Common Payload Using Two UAVS", Proceedings of the ASME 2017 Dynamic Systems and Control Conference. American Society of Mechanical Engineers Digital Collection, 2017, pp. 1-10.

Sundqvist, "Cellular Controlled Drone Experiment: Evaluation of Network Requirements", Aalto University School of Engineering, 2015, pp. 1-61.

Nguyen, et al., "A Novel Robotic Platform for Aerial Manipulation Using Quadrotors as Rotating Thrust Generators", IEEE Transactions on Robotics, vol. 34, No. 2, 2018, pp. 353-369.

Lim, et al., "Implementation of Load Transportation Using Multiple Quadcopters", 2017 IEEE International Conference on Advanced Intelligent Mechatronics (AIM), 2017, pp. 639-644.

Rastgoftar, et al., "Cooperative Aerial Payload Transport Guided by an in Situ Human Supervisor", IEEE Transactions on Control Systems Technology, vol. 27, No. 4, 2018, pp. 1452-1467.

Rastgoftar, et al., "Continuum Deformation of a Multiple Quadcopter Payload Delivery Team Without Inter-Agent Communication", 2018 International Conference on Unmanned Aircraft Systems (ICUAS). IEEE, 2018, pp. 539-548.

Rastgoftar, et al., "Continuum Deformation of a Multi-Quadcopter System in a Payload Delivery Mission", IFAC—PapersOnLine, vol. 50, No. 1, 2017, pp. 3455-3462.

Rastgoftar, et al., "Cooperative Aerial Lift and Manipulation (CALM)", Aerospace Science and Technology, vol. 82, 2018, pp. 105-118.

Weber, et al., "Fault-Tolerant Control Design for Over-Actuated System Conditioned by Reliability: A Drinking Water Network Application", 8th IFAC Symposium on Fault Detection, Supervision and Safety of Technical Processes (SAFEPROCESS), Proceedings vols. vol. 45, No. 20, 2012, pp. 558-563.

Wang, et al., "Passive Actuator Fault-Tolerant Control for A Class of Overactuated Nonlinear Systems and Applications to Electric Vehicles", IEEE Transactions on Vehicular Technology, vol. 62, No. 3, 2013, pp. 972-985.

Casavola, "Fault-Tolerant Adaptive Control Allocation Schemes for Overactuated Systems", International Journal of Robust and Nonlinear Control, vol. 20, No. 17, 2010, pp. 1958-1980.

Zhang, et al., "Collision Avoidance in Fixed-Wing UAV Formation Flight Based on A Consensus Control Algorithm", IEEE Access, vol. 6, 2018, pp. 43672-43682.

Du, et al., "Pursuing an Evader Through Cooperative Relaying in Multi-Agent Surveillance Networks", Automatica, vol. 83, 2017, pp. 155-161.

Artuñedo, et al., "Consensus-Based Cooperative Control Based on Pollution Sensing and Traffic Information for Urban Traffic Networks", Sensors, vol. 17, No. 5, No. 953, 2017, pp. 1-16.

Cheng, et al., "Event-Triggered Consensus of Homogeneous and Heterogeneous Multiagent Systems with Jointly Connected Switching Topologies", IEEE Transactions on Cybernetics, vol. 49, No. 12, 2019, pp. 4421-4430.

Tu, et al., "Decentralized Finite-Time Adaptive Consensus of Multiagent Systems with Fixed and Switching Network Topologies", Neurocomputing, vol. 219, 2017, pp. 59-67.

Muñoz, et al., "Adaptive Consensus Algorithms for Real-Time Operation of Multi-Agent Systems Affected by Switching Network

(56) References Cited

OTHER PUBLICATIONS

Events", International Journal of Robust and Nonlinear Control, vol. 27, No. 9, 2017, pp. 1566-1588.

Liu, et al., "Leader-Following Attitude Consensus of Multiple Rigid Body Systems Subject to Jointly Connected Switching Networks", Automatica, vol. 92, 2018, pp. 63-71.

Ma, et al., "Consensus Switching of Second-Order Multiagent Systems with Time Delay", IEEE Transactions on Cybernetics, vol. 52, No. 5, 2022, pp. 3349-3353.

Wang, et al., "Fault-Tolerant Consensus Tracking Control for Linear Multiagent Systems Under Switching Directed Network", IEEE Transactions on Cybernetics, vol. 50, No. 5, 2020, pp. 1921-1930.

Shahab, et al., "Distributed Consensus-Based Fault Tolerant Control of Islanded Microgrids", IEEE Transactions on Smart Grid, vol. 11, No. 1, 2020, pp. 37-47.

Liu, et al. "On Kalman-Consensus Filtering with Random Link Failures Over Sensor Networks", IEEE Transactions on Automatic Control, vol. 63, No. 8, 2018, pp. 2701-2708.

Leblanc, et al., "Consensus in Networked Multi-Agent Systems with Adversaries", Proceedings of the 14th International Conference on Hybrid Systems: Computation and Control, 2011, pp. 281-290.

Ji, et al., "Containment Control in Mobile Networks", IEEE Transactions on Automatic Control, vol. 53, No. 8, 2008, pp. 1972-1975.

Liu, et al., "Necessary and Sufficient Conditions for Containment Control of Networked Multi-Agent Systems", Automatica, vol. 48, No. 7, 2012, pp. 1415-1422.

Li et al., "Containment Control of Multi-Agent Systems with Fixed Time-Delays in Fixed Directed Networks", Neurocomputing, vol. 173, 2016, pp. 2069-2075.

Su, et al., "Multi-Agent Containment Control with Input Saturation on Switching Topologies", IET Control Theory & Applications, vol. 9, No. 3, 2015, pp. 399-409.

Asgari, et al., "Necessary and Sufficient Conditions for Containment Control of Heterogeneous Linear Multi-Agent Systems with Fixed Time Delay", IET Control Theory & Applications, vol. 13, No. 13, 2019, pp. 2065-2074.

Atrianfar, "Sampled-Time Containment Control of High-Order Continuous-Time Mass Under Heterogenuous Time-Varying Delays and Switching Topologies: A Scrambling Matrix Approach", Neurocomputing, vol. 395, 2020, pp. 24-38.

Cui, et al., "Command-Filter-Based Distributed Containment Control of Nonlinear Multi-Agent Systems with Actuator Failures", International Journal of Control, vol. 91, No. 7, 2018, pp. 1708-1719.

Ye, et al., "Observer-Based Distributed Adaptive Fault-Tolerant Containment Control of Multi-Agent Systems with General Linear Dynamics", ISA Transactions, vol. 71, 2017, pp. 32-39.

Zuo, et al., "Resilient Output Containment of Heterogeneous Cooperative and Adversarial Multigroup Systems", IEEE Transactions on Automatic Control, vol. 65, No. 7, 2020, pp. 3104-3111.

Qin, et al., "Distributed Finite-Time Fault-Tolerant Containment Control for Multiple Ocean Bottom Flying Node Systems with Error Constraints", Ocean Engineering, vol. 189, No. 106341, 2019, p. 106341.

Xu, et al., "Distributed Fixed-Time Triggering-Based Containment Control for Networked Nonlinear Agents Under Directed Graphs", IEEE Transactions on Circuits and Systems—I: Regular Papers, vol. 67, No. 10, 2020, pp. 3541-3552.

Lengyel, et al., "Real-Time Robot Motion Planning Using Rasterizing Computer Graphics Hardware", Computer Graphicss, vol. 24, No. 4, 1990, pp. 327-335.

Melchior, et al., "Particle RRT for Path Planning with Uncertainty", IEEE International Conference on Robotics and Automation, 2007, pp. 1617-1624.

Lavalle, "Planning Algorithms", Cambridge University Press, 2006, pp. 1-1007.

Goerzen, et al., "A Survey of Motion Planning Algorithms from the Perspective of Autonomous UAV Guidance", Journal of Intelligent and Robotic Systems, vol. 57, No. 1-4, 2010, pp. 65-100.

Low, et al., "Information-Theoretic Approach to Efficient Adaptive Path Planning for Mobile Robotic Environmental Sensing", arXiv preprint arXiv:1305.6129, 2013, 10 pages.

Popa, et al., "Adaptive Sampling Algorithms for Multiple Autonomous Underwater Vehicles", IEEE/OES Autonomous Underwater Vehicles, 2004, pp. 108-118.

Low, et al., "Active Markov Information-Theoretic Path Planning for Robotic Environmental Sensing", The 10th International Conference on Autonomous Agents and Multiagent Systems—vol. 2, International Foundation for Autonomous Agents and Multiagent Systems, 2011, pp. 753-760.

Dearden, et al., "Abstraction and Approximate Decision-Theoretic Planning", Artificial Intelligence, vol. 89, No. 1, 1997, pp. 219-283.

Seuken, et al., "Formal Models and Algorithms for Decentralized Decision Making Under Uncertainty", Autonomous Agents and Multi-Agent Systems, vol. 17, No. 2, 2008, pp. 190-250.

Kaelbling, et al., "Reinforcement Learning: A Survey," Journal of Artificial Intelligence Research, vol. 4, 1996, pp. 237-285.

Sutton, et al., "Reinforcement Learning: An Introduction", MIT Press Cambridge, vol. 1, No. 1, 1998, pp. 1-315.

Russell, et al., "Artificial Intelligence—A Modern Approach", Prentice-Hall, Englewood Cliffs, vol. 25, 1995, p. 27.

Spaan, "Partially Observable Markov Decision Processes", Reinforcement Learning: State of the Art, Springer Verlag, 2012, pp. 387-414.

Cassandra, et al., "Acting Optimally in Partially Observable Stochastic Domains", 94 AAAI Proceedings, 1994, pp. 1023-1028.

Littman, et al., "Learning Policies for Partially Observable Environments: Scaling Up", Machine Learning Proceedings 1995: Proceedings of the Twelfth International Conference on Machine Learning, Tahoe City, California, Jul. 9-12, 1995. Morgan Kaufmann, 2016, pp. 362-370.

Rastgoftar, et al., "A Data-Driven Approach for Autonomous Motion Planning and Control in Off-Road Driving Scenarios", 2018 Annual American Control Conference (ACC), 2018, pp. 5876-5883.

Rastgoftar, et al., "Unmanned Vehicle Mission Planning Given Limited Sensory Information", 2017 American Control Conference (ACC), 2017, pp. 4473-4479.

Rastgoftar, et al., "Unmanned Vehicle Autonomy for Long-Duration Surveillance Missions", 2018, IEEE/OES Autonomous Underwater Vehicle Symposium, Porto, Portugal, 6 pages.

Rastgoftar, et al., "Scalable Vehicle Team Continuum Deformation Coordination with Eigen Decomposition", IEEE Transactions on Automatic Control, 2021, pp. 2514-2521.

Rastgoftar, "Integration of A-Star Search and Classic Optimal Control for Safe Planning of Continuum Deformation of A Multi-Quadcopter System", IEEE Transactions on Aerospace and Electronic Systems, vol. 58, No. 5, 2021, pp. 4119-4134.

Romano, et al., "Experimental Evaluation of Continuum Deformation with a Five Quadrotor Team", 2019 American Control Conference (ACC) IEEE, 2019, pp. 2023-2029.

Rastgoftar, et al., "Safe Affine Transformation-Based Guidance of a Large-Scale Multi-Quadcopter System (MQS)", IEEE Transactions on Control of Network Systems, vol. 8, No. 2, 2021, pp. 640-653.

Rastgoftar, "Continuum Deformation of Multi-Agent Systems.", Springer, 2016, pp. 1-224.

Rastgoftar, et al., "Scalable Vehicle Team Continuum Deformation Coordination with Eigen Decomposition", IEEE Transactions on Automatic Control, vol. 67, No. 5, pp. 2514-2521.

Rastgoftar, et al., "Evolution of Multi-Agent Systems as Continua", Journal of Dynamic Systems, Measurement and Control, vol. 136, No. 4, 2014, p. 041014-1-041014-9.

Rastgoftar, et al., "Distributed Control of Swarm Motions as Continua Using Homogeneous Maps and Agent Triangulation", 2013 European Control Conference (ECC), 2013, pp. 2824-2830.

Rastgoftar, et al., "Asymptotic Tracking and Robustness of MAS Transitions Under A New Communication Topology", IEEE Transactions on Automation Science and Engineering, vol. 15, No. 1, 2018, pp. 16-32.

Rastgoftar, et al., "An Alignment Strategy for Evolution of Multi-Agent Systems", Journal of Dynamic Systems, Measurement and Control, vol. 137, No. 2, 2015, pp. 021009-1-021009-10.

(56) References Cited

OTHER PUBLICATIONS

Rastgoftar, "Alignment as Biological Inspiration for Control of Multi-Agent Systems", Continuum Deformation of Multi-Agent Systems. Springer, 2016, pp. 147-161.

Rastgoftar, et al., "Swarm Motion as Particles of a Continuum with Communication Delays", Journal of Dynamic Systems, Measurement, and Control, vol. 137, No. 11, 2015, pp. 111008-1-111008-13.

Rastgoftar, et al., "Formal Specification of Continuum Deformation Coordination", 2019 American Control Conference (ACC). IEEE, 2019, pp. 3358-3363.

Rastgoftar, et al., "Safe Multi-Quadcopter System Continuum Deformation Over Moving Frames", IEEE Transactions on Control of Network Systems, 2018, pp. 737-749.

Rastgoftar, et al., "Continuum Deformation Coordination of Multi-Agent Systems Using Cooperative Localization", 2021 IEEE Conference on Control Technology and Applications (CCTA), pp. 90-96.

Rastgoftar, "Fault-Resilient Continuum Deformation Coordination", IEEE Transactions on Control of Network Systems, vol. 8, No. 1, 2021, pp. 423-436.

Rastgoftar, et al., "Safe Multi-Cluster UAV Continuum Deformation Coordination", Aerospace Science and Technology, vol. 91, 2019, pp. 640-655.

Liang, et al., "Multi-Quadcopter Team Leader Path Planning Using Particle Swarm Optimization", AIAA Aviation 2019 Forum, 2019, p. 3258.

Rastgoftar, et al., "Cooperative Aerial Payload Transport Guided by an In Situ Human Supervisor", IEEE Transactions on Control Systems Technology, vol. 27, No. 4, 2019, pp. 1452-1467.

Rastgoftar, et al., "Physics-Based Freely Scalable Continuum Deformation for UAS Traffic Coordination", IEEE Transactions on Control of Network Systems, vol. 7, No. 2, 2020, pp. 532-544.

Stevens, et al., "Specification and Evaluation of Geofence Boundary Violation Detection Algorithms", 2017 International Conference on Unmanned Aircraft Systems (ICUAS), IEEE, 2017, pp. 1588-1596.

Stevens, et al., "Geofence Boundary Violation Detection in 3D Using Triangle Weight Characterization with Adjacency", Journal of Intelligent & Robotic Systems, vol. 95, No. 1, 2019, pp. 239-250.

Rastgoftar, et al., "A Physics-Based Finite-State Abstraction for Traffic Congestion Control", 2021 American Control Conference (ACC), IEEE 2021, 7 pages.

Rastgoftar, et al., "An Integrative Behavioral-Based Physics-Inspired Approach to Traffic Congestion Control", Proceedings of the American Society of Mechanical Engineers (ASME) 2020 Dynamic Systems and Control Conference (DSCC), 2020, 7 pages.

USDA ERS, Sector at a Glance, 2020, https://www.ers.usda.gov/topics/animal-products/cattle-beef/sector-at-a-glance/, 12 pages.

International Preliminary Report on Patentability from corresponding PCT Appln. No. PCT/US2023/013635, dated May 17, 2023. 5 pages.

International Search Report and Written Opinion from corresponding PCT Appln. No. PCT/US2023/013635, dated May 17, 2023. 7 pages.

\* cited by examiner

CONFIGURABLE UNMANNED AERIAL VEHICLE SYSTEM

The present application is a U.S. National Stage Application of PCT/US23/13635, filed 22 Feb. 2023, which claims the benefit of U.S. Provisional Application Ser. No. 63/312,602, filed Feb. 22, 2022, both of which are hereby incorporated by reference in their entirety.

TECHNICAL FIELD

The present disclosure relates to a configurable unmanned ariel vehicle system.

BACKGROUND

Multi-agent coordination is an active research area with growing interest in applying multi-copters for aerial payload transport and package delivery applications. Indeed, major U.S. companies such as Amazon, Google, and UPS have already tested and commercialized safe package-delivery missions using drones. Despite the huge interest in aerial payload transport, delivery drones are limited to only carry light payloads. Furthermore, carrying each payload with a single drone is not robust to actuation and sensor failures. If a drone fails, the payload transport mission must be stopped. To overcome these "single drone" limitations, some researchers have investigated cooperative payload transport by multiple drones where each drone was connected to a slung payload via a tether. However, this solution may not function properly, and especially in severe weather conditions, such as high winds, when payload oscillation can impose significant disturbance forces on the drones. This is a problem when the operation of a multi-copter unmanned aerial vehicle (UAV) team is not robust to these disturbance forces—if each multi-copter independently executes the trajectory control to follow the desired group coordination.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1A:
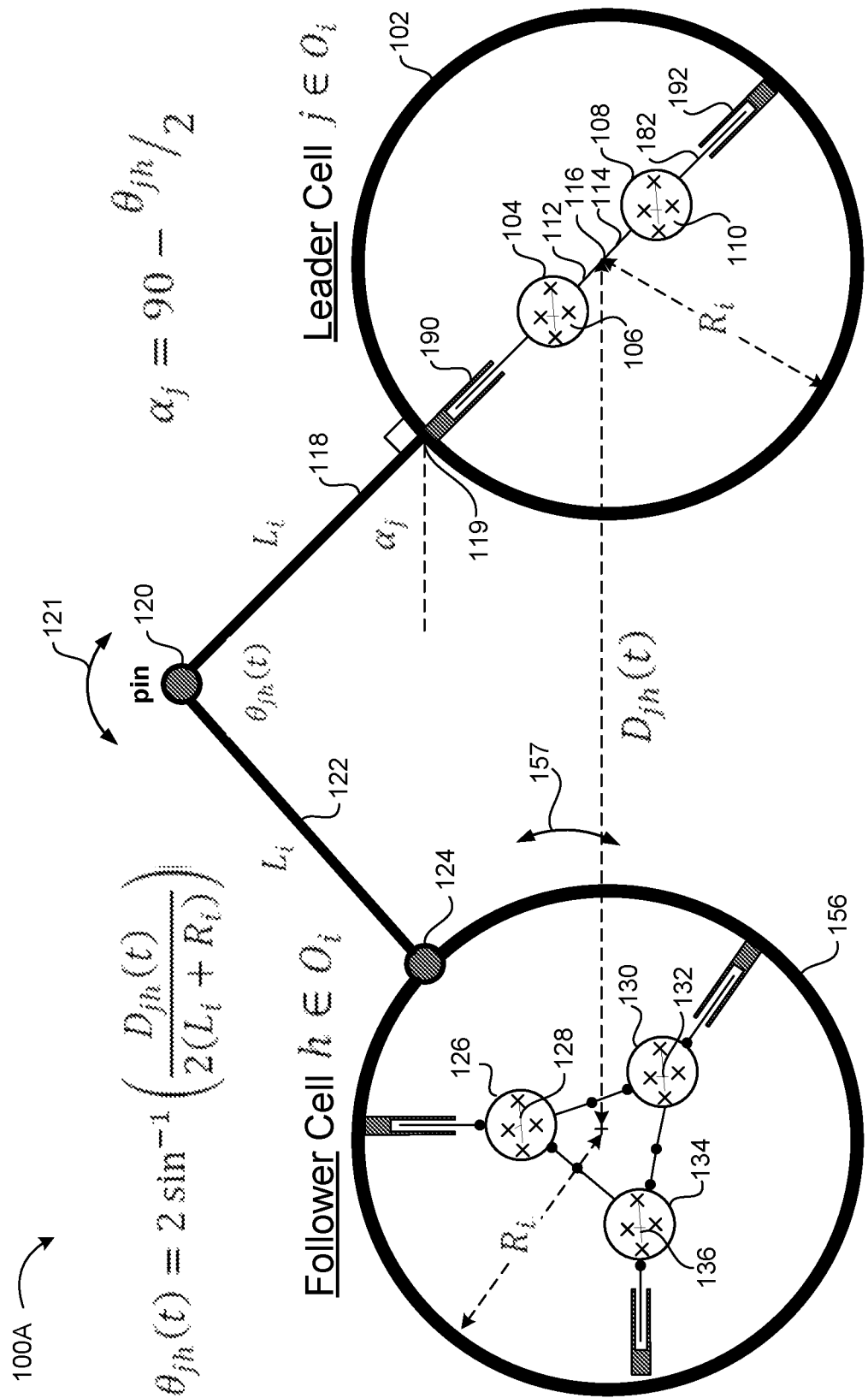
FIGS. 1A and 1B illustrate various views of an unmanned arial vehicle (UAV) system according to several embodiments of the present disclosure.
Figure 1B:
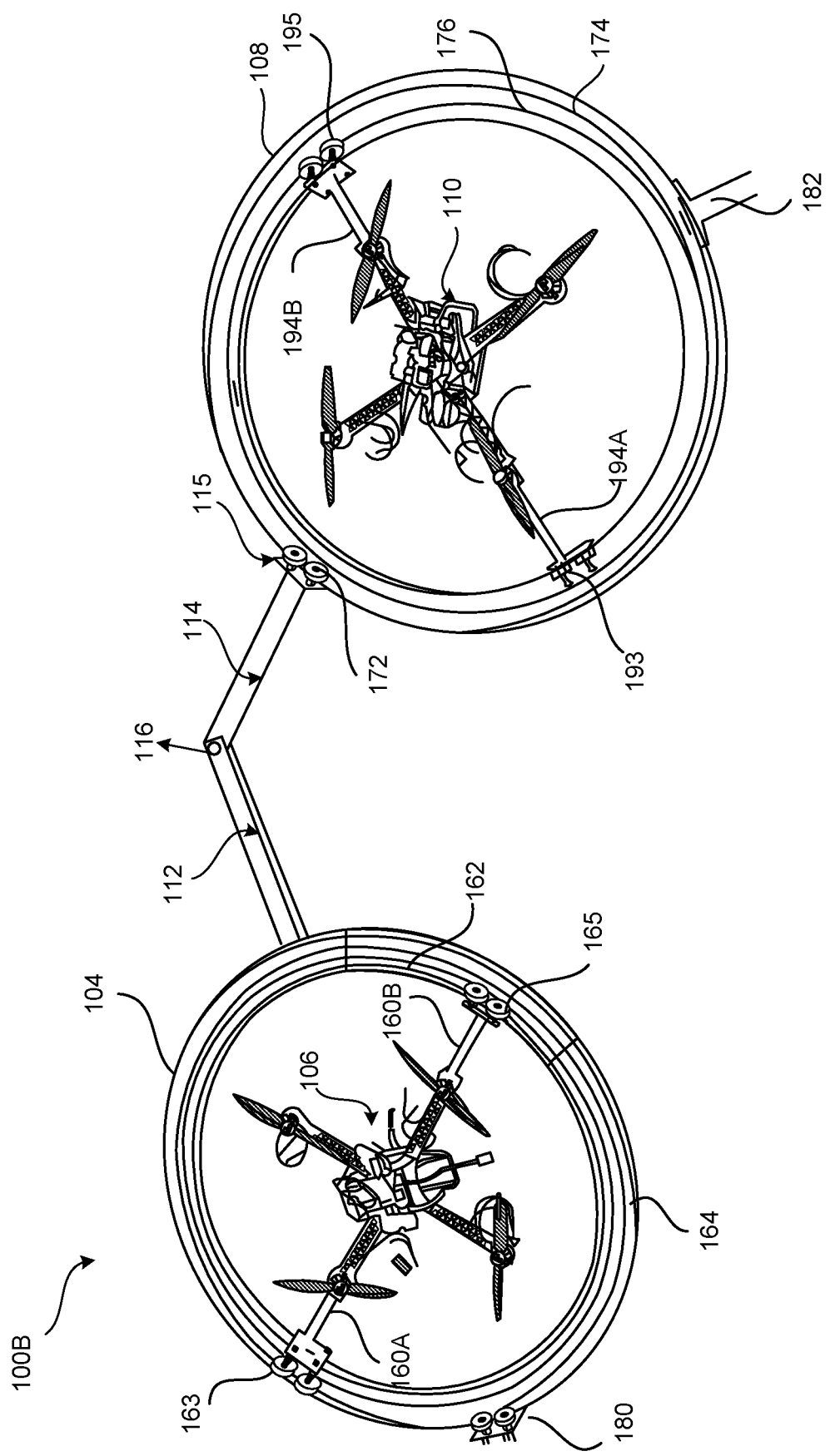

FIGS. 1A and 1B illustrate a top-down view 100A and a perspective view 100B, of an unmanned arial vehicle (UAV) system according to several embodiments of the present disclosure (100A and 100B are also collectively referred to herein as "system 100"). Referring first to the top-down view of FIG. 1A, the UAV system 100A includes a plurality of non-terminal cells (NTC) 102, 156 each containing a plurality of terminal cells (TC) 104, 108 and 126, 130, 134, respectively. Each NTC 102, 156 is connected together via NTC linkage members 118 and 122. NTC linkage member 118 is affixed (non-moving and non-pivoting) to NTC 102 at joint 119. The distal ends of each NTC member 118, 122 are coupled together via a pivot joint 120. NTC linkage member 122 includes a movable coupling member 124 to movably couple the NTC linkage member 122 to the NTC 156. Each NTC 102, 156 is generally formed a rigid ring structure having sufficient strength to remain relatively rigid for given load, thrust and/or environmental conditions, and thus, may be selected for weight management based on load, thrust and/or environmental conditions, etc. Each NTC 102, 156, NTC linkage member 118, 122, pivot joint 120 and movable coupling member 124 may be formed of metal, plastic, composite material and/or other materials of sufficient rigidity according to the teachings herein. Although the Figures depict a circular ring structure for each NTC, it should be understood that other ring shapes (e.g., square, triangle, polygon, irregular) may be substituted without departing from the teachings of the present disclosure (and thus, "ring structure" and "cell" as used herein is intended to encompass all types of enclosed ring shapes). Each NTC linkage member 118 and 122 each formed of a rigid, elongated structure having sufficient strength to remain relatively rigid for given load, thrust and/or environmental conditions, and thus, may be selected for weight management based on load, thrust and/or environmental conditions, etc.

NTC 102 encloses a plurality of TCs 104, 108, and each TC 104, 108 encloses a respective UAV 106, 110. Similarly, NTC 156 encloses a plurality of TCs 126, 130, 134, and each TC 126, 130, 134 encloses a respective UAV 128, 132, 136. NTC 102 illustrates an arrangement that contains two TCs 104, and 108 and thus two UAVs 106, 110, and NTC 156 illustrates an arrangement that contains three TCs 126, 130, 134, and thus three UAVs 128, 132, 136. The inventor herein has determined that the number of TCs enclosed within each NTC is preferably 2, 3 or 6, thus ensuring the connective goal of each NTC being coupled together by a single moveable connection, and each TC being coupled together by a single movable connection. Of course, depending on the payload weight, mission length, available thrust, etc. multiple TCs and multiple NTCs may be coupled together in a similar fashion as illustrated. The number of fixed couplings between NTCs and between TCs is dependent on the number of such elements present in a given system. Each UAV described herein may include, for example, a quadcopter, tri-copter, bi-copter, single rotor copter and/or other thrust mechanisms know in the art such mini-jet engines, etc., and the system 100 may include a mixture of such UAV devices.

Each NTC 102, 156 is coupled together in a single plane, and by way of example, the single plane illustrated in FIG. 1A. Each NTC 102, 156 may move relative to one another within the single plane of the NTCs, but movement of the NTCs in every plane normal to the single plane of NTCs is reduced or eliminated by virtue of the rigidity of the NTCs and the linkage members 118 and 122 (and the rigidity of pivot member 120 and movable member 124). Thus, by restricting movement of the NTCs to a single plane, the ring structures of the NTCs prevent in-flight collisions between UAVs contained within NTC 102 and UAVs contained within NTC 156. Pivot joint 120 enables relative movement of NTC 102 and 156, as illustrated by arrow 121, and movement is constrained when NTC 102 is pressed against NTC 156.

FIG. 1B illustrates details of TC 104 and 108. TC 104 includes an inner slot 162 and outer slot 164 on the top surface of the ring structure of TC 104. Although not shown in this perspective, TC 104 may also include inner and outer slots on the bottom surface of the ring structure. UAV 106 includes pivoting coupling members 160A and 160B to pivotally couple the UAV 106 to the TC 104. The pivoting coupling members 160A and 160B enable the UAV to pivot with respect to the single plane, as illustrated by pivoting quadcopter j (106). The pivoting coupling members 160A and 160B may each be fixed to UAV 106 (while enabling pivoting of UAV 106) and may also include moveable coupling members 163/165 to enable UAV 106 to rotate within the TC 104 and within the single plane. TC 108 and UAV 110 may be similarly constructed as TC 104 and may include outer slot 174 and inner slot 176 (and may also include similar slots on the bottom surface thereof). UAV 106 and may include pivoting coupling members 194A and 194B to pivotally couple the UAV 110 to the TC 108, and pivoting coupling members 194A and 194B include moveable coupling members 193/195 disposed within slot 176 to enable the UAV 110 to rotate within the TC 108 and within the single plane.

TC 104 and 108 are connected together via TC linkage members 112 and 114. TC linkage member 112 is affixed (non-moving and non-pivoting) to TC 104. The distal ends of each TC member 112, 114 are coupled together via a pivot joint 116. TC linkage member 114 includes a movable coupling member 115 to movably couple the TC linkage member 114 to the TC 108. The movable coupling member 115 includes a pair of rollers 172 to roll within outer slot 174. The TC 108 may also include a slot on the bottom side thereof (not shown), similar to slot 174, and the movable coupling member 115 may include an additional pair of rollers (not shown) to roll within the bottom slot. TC 108 may have a similar structure as NTC 156, described above. Each TC 104, 108 is generally formed a rigid ring structure having sufficient strength to remain relatively rigid for given load, thrust and/or environmental conditions, and thus, may be selected for weight management based on load, thrust and/or environmental conditions, etc. Each TC 104, 108, TC linkage member 112, 114, pivot joint 116, movable coupling member 115 and coupling members 180, 182 may be formed of metal, plastic, composite material and/or other materials of sufficient rigidity according to the teachings herein. Although the Figures depict a circular ring structure for each TC, it should be understood that other ring shapes (e.g., square, triangle, polygon, irregular) may be substituted without departing from the teachings of the present disclosure (and thus, "ring structure" as used herein is intended to encompass all types of enclosed ring shapes). Each TC linkage member 112 and 114 each formed of a rigid, elongated structure having sufficient strength to remain relatively rigid for given load, thrust and/or environmental conditions, and thus, may be selected for weight management based on load, thrust and/or environmental conditions, etc.

Moveable coupling members 115, 163, 165, 124, 193 and 195 may each be constructed in a similar fashion to include rollers to roll within slots in the corresponding TC and NTC. In other embodiments the movable coupling members 115, 163, 165, 124, 193 and 195 may be formed using, for example, bearing seals, greased couplings, plastic couplings (e.g., tongue-and-groove couplings, etc.), etc. to enable NTC 156 to roll (in the single plane) with respect to linkage member 122.

To provide the TC 104 to be movable with respect to TC 108 and NTC 102, the system also includes interface coupling 180/190 coupled between TC 104 and NTC 102. Interface coupling 180/190 is generally configured as a piston member (180) and cylinder member (190) to permit the TC 104 to move in the plane of the NTC 102. Cylinder member 190 is fixed to the inner surface of NTC 102, and piston member 180 can move within cylinder member 190. Since member 112 is fixed to TC 104, piston member 180 includes a movable connection to TC 104 (similar to movable connections 115, 163, 165, 193, 195 described above) thus enabling rolling of TC 104 with respect to piston 180. Similarly, interface coupling 182/192 is generally configured as a piston member (182) and cylinder member (192) to permit the TC 108 to move in the plane of the NTC 102. Cylinder member 192 is fixed to the inner surface of NTC 102, and piston member 182 can move within cylinder member 192. Since member 114 is movable with respect to TC 104, piston member 182 is fixed to TC 104. Of course, NTC 156 and TCs 126, 130 and 136 include similar interface couplings. The teachings herein apply generally to any inner/outer coupling of cells.

Generalized Configuration of UAV Structures

With the foregoing examples of FIGS. 1A and 1B, the UAV system of the present disclosure may be generalized to include M number of cells and N number of UAVs (where N<M), and where connections are distributed in a two-dimensional plane (defined by the cells). As used herein, the two-dimensional plane defined by the cells may also be referred to as the deformation plane.

Figure 2:
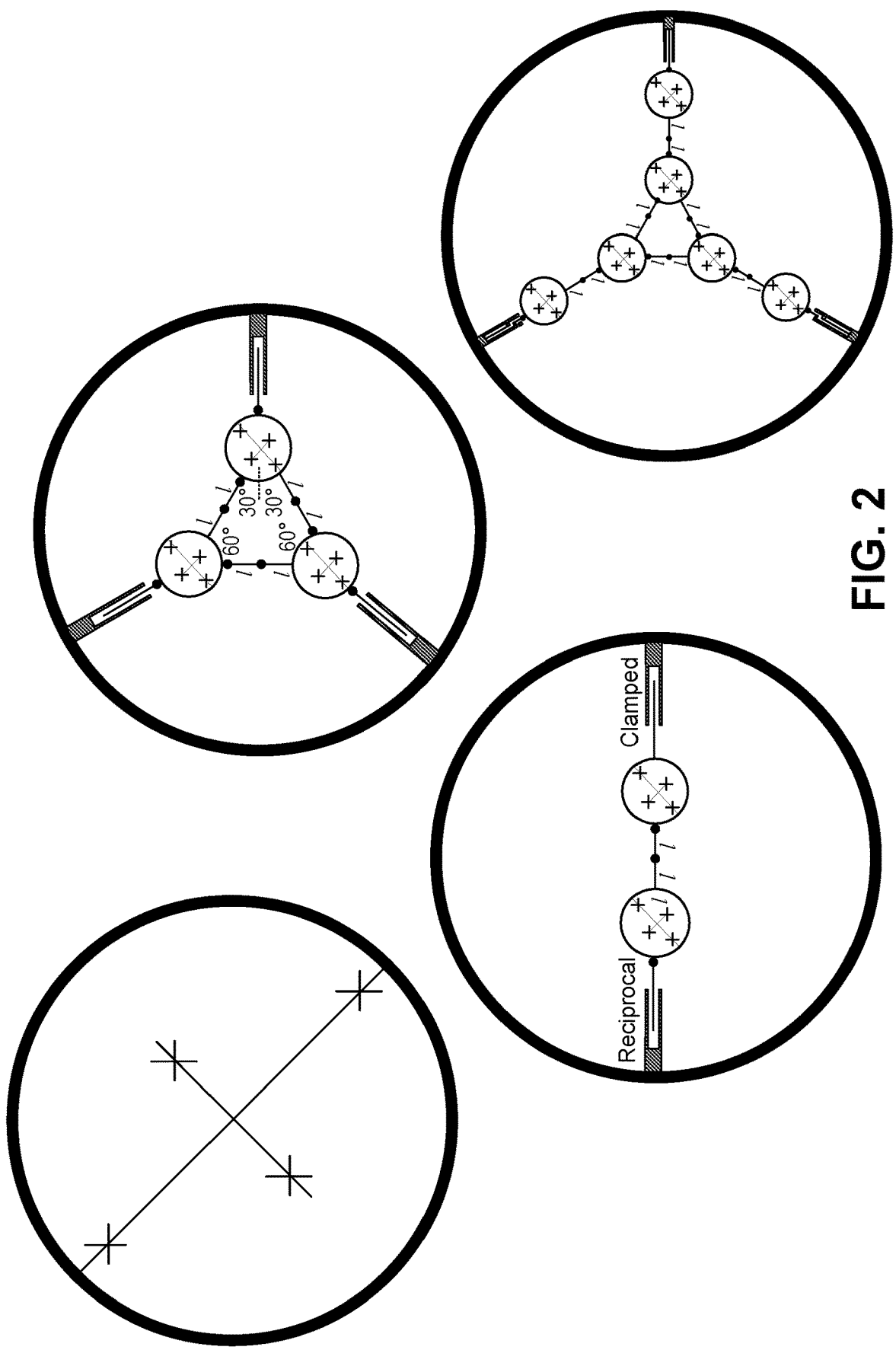
FIG. 2 illustrates generalized UAV systems according to embodiments of the present disclosure.

Inter-connections between the cells may be defined by a tree graph T (V, E) with node set $V=\{0, \ldots, M\}$ and edge set $E \subset V \times V$, i.e., $(i, j) \in E$ is an edge directed from $i \in V$ to $j \in V$. Set V can be expressed as $V = V_L \cup V_F$ (where U is the set union operation), where subsets $V_L = \{1 \ldots, N\}$ and $V_F = \{0, N+1, \ldots, M\}$ define the root node, the terminal (leaf) nodes, and the non-terminal nodes of graph T, respectively. The root node $0 \in V$ represents a virtual cell (the cell surrounding the entirety of the system) and the remaining cells represent the real cells. The leaf (terminal) nodes of graph T, identified by set $V_L$, represent the cells that enclose a single quadcopter (see left side of FIG. 2). The remaining non-terminal nodes of T, identified by set $V_F$, represent the cells that enclose, two, three, or six other cells (see middle and right side of FIG. 2). For every $i \in V$, set $I_i = \{j \in V: (j,i)\}$ and $O_i = \{j \in V: (i,j) \in E\}$ define in-neighbors and out-neighbors of node $i \in V$, respectively. The graph T may satisfy the following three main requirements:

1. Every non-root $i \in V \setminus \{0\}$ has a single in-neighbor, i.e., $|I_i|=1$;
2. The number of out-neighbors of every non-leaf $i \in V_F$, is either 2, 3, or 6, i.e., $|O_i| \in \{2, 3, 6\}$, if $i \in V_F$.
3. The number of out-neighbors of every leaf $i \in V_L$, is 1, i.e., $|O_i|=1$, if $i \in V_L$.

Figure 3A:
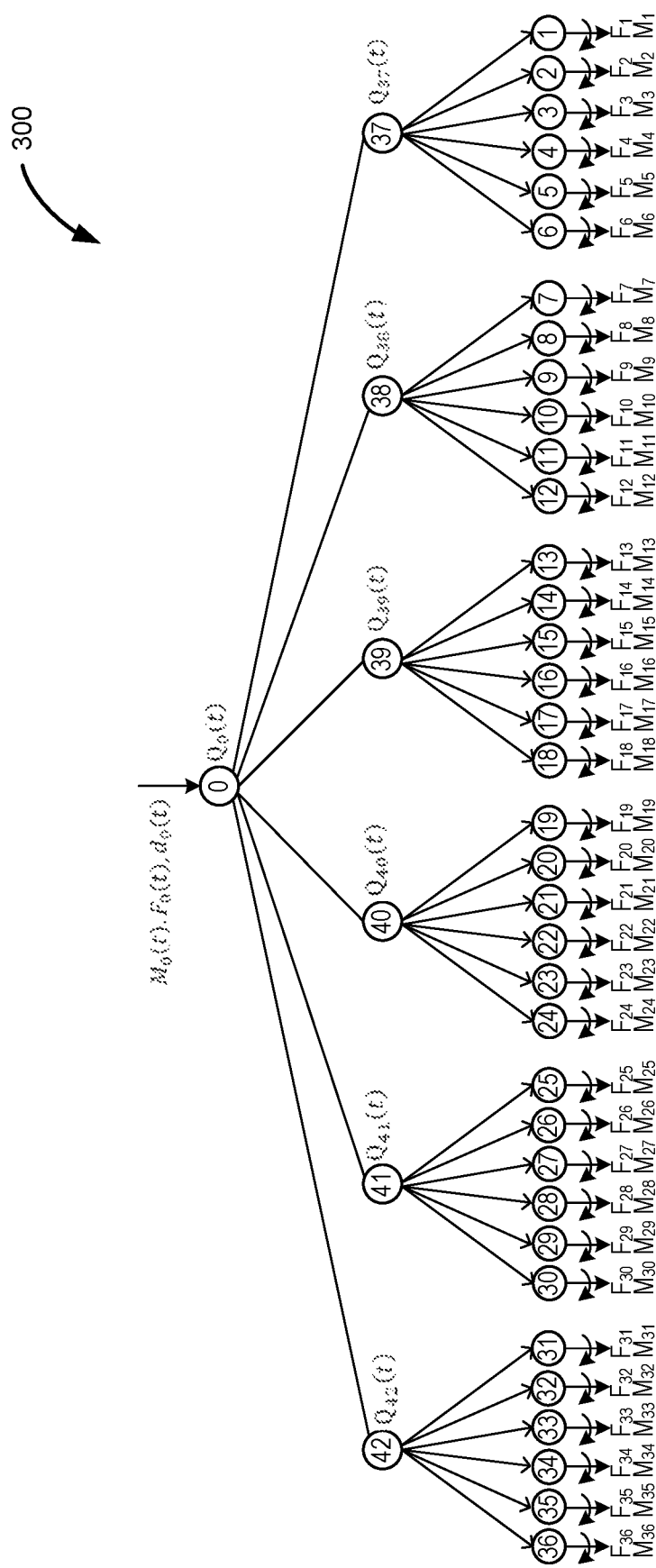
FIG. 3A illustrates a T graph according to one example embodiment of the present disclosure.
Figure 3B:
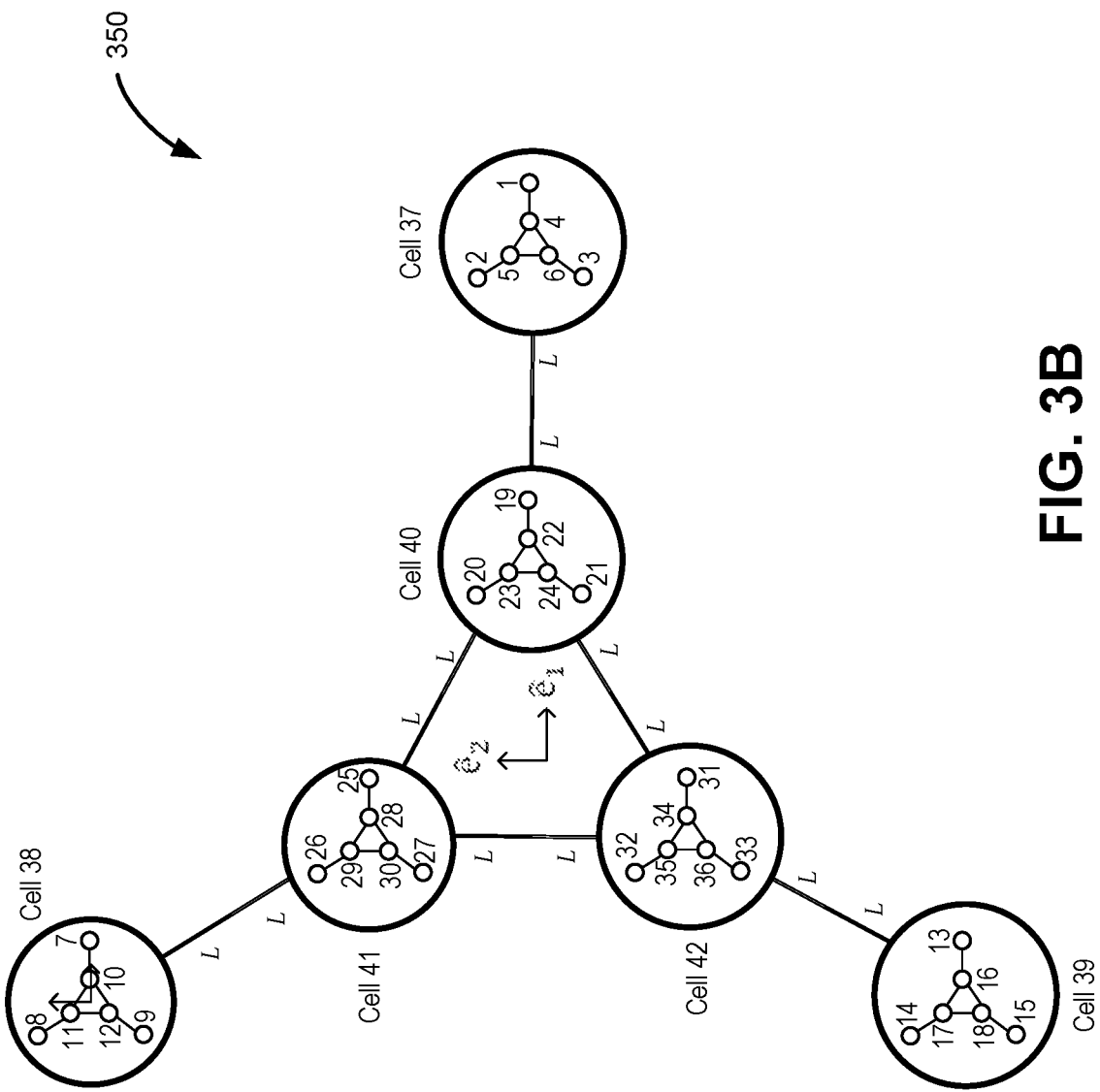
FIG. 3B illustrates an example UAV system corresponding to the T graph of FIG. 3A.

The "condition 2" provides feasibility of kinematics of the UAV SYSTEM, as described below. By way of example, FIG. 3A illustrates a tree graph 300 with cells identified by set $V=\{0, 1, \ldots, 42\}$ and set $V_L=\{1, \ldots, 36\}$, which correspond to the quadcopters of the UAV system 350 as illustrated in FIG. 3B.

Connections of Two Leaf Cells. The quadcopters are identified by set $V_L$ where $i \in V_L$ is the same index number for a leaf cell and the enclosed quadcopter. The leaf cell $i \in V_L$ has inner and outer rails where two arms of quadcopter i∈$V_L$, directed along body axis $\hat{i}_i$, are restricted to slide along the inner rail of leaf cell i∈$V_L$ (see FIGS. 1A and 1B). In these examples, all enclosing leaf cells have the same radius r. Leaf cells enclosing quadcopters i, j∈$V_L$ are connected as illustrated in FIGS. 1A and 1B by two bars 118/122 with equal length l. The connecting bars are pinned at intersection point $O_{ij}$ (120) where bar I 118 is clamped (fixed) on the external surface of cell i 102, but bar j 122 rolls on the outer rail of circular cell j 156. Therefore, bar i and the leaf cell i always have the same rotation, angular velocity, and angular acceleration. On the other hand, motions of the quadcopter j and bar j do not constrain the motion of the leaf cell j in the deformation plane.

Dij(t) denote the distance of the centers of leaf cells i and j at time t, with the same radius r. Then, the angle between the bars i and j, with the same length l, is denoted by θij(t) and obtained by Equation 1 below:

$$\theta_{ij}(t) = 2\sin^{-1}\left(\frac{d_{ij}(t)}{2(l+r)}\right) \quad \text{Eq. (1)}$$

as shown in FIG. 1A. The configurations of the two circular cells i and j, shown in FIG. 1B, impose no constraint on the motion of the centers of cells i and j, if bar j rolls on the outer rail of cell j, and $$2r < d_{ij}(t) < 2(l+r), \forall t.$$

This implies that the quadcopters will freely move in the deformation plane of the UAV SYSTEM.

Outer-Outer Connections Between Non-Leaf Cells and Other Cells

The outer-outer connection is used to connect two out-neighbors of cell i∈$V_F$, denoted by cells j, h∈$O_i$. In this example, all out-neighbors of cell i∈$V_F$ have the same radius $R_i$ and the bars connecting out-neighbor cell j∈$O_i$ and h∈$O_i$ have the same length $L_i$ for every i∈$V_F$. The angle between connecting bars j∈$O_i$ and h∈$O_i$ is denoted by $\Theta_{jh}$ and obtained by:

$$\Theta_{jh}(t) = 2\sin^{-1}\left(\frac{D_{jh}(t)}{2(L_i+R_i)}\right), j, h \in O_i, i \in V_F.$$

For every two connected cells, as illustrated in FIG. 1A, the cell with the clamped bar is the leader and the other cell is the follower. Therefore, every non-leaf cell j∈$V_F$ has a single follower defined by singleton set $F_j$={h}. In operations, when the UAV SYSTEM system deforms, the leader cell j and the follower cell h∈$O_j$ are mandated to rotate at $$\alpha_j(t) = 90 - \frac{\Theta_{jh}(t)}{2}, \forall j \in V_F, \forall h \in O_j, \forall t,$$

with respect to their reference configurations, as the result of continuum deformation of the rigid cells. Angle αj is referred to herein as the continuum deformation (CD) rotation angle or CD rotation angle.

Inner-Outer Connections Between Non-Leaf Cells and Other Cells

Figure 4A:
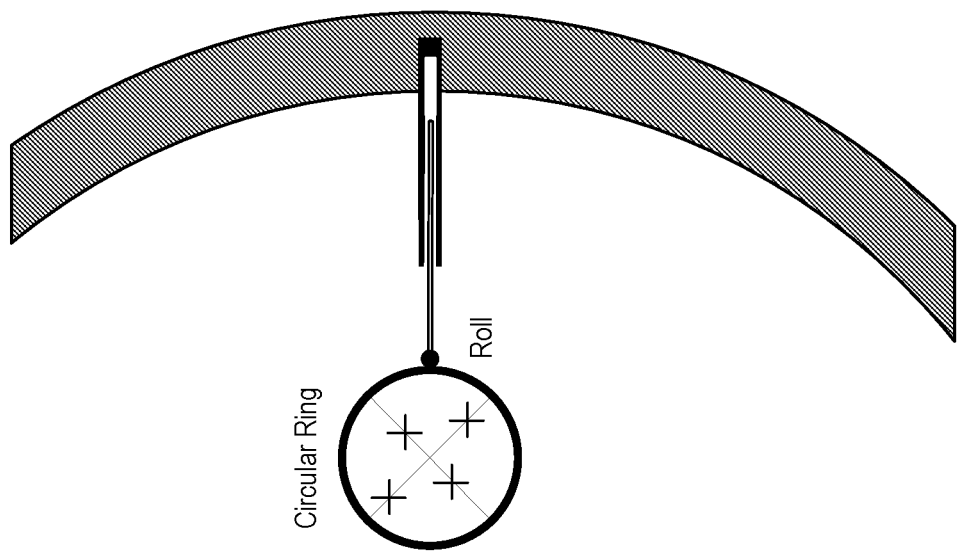
FIGS. 4A-4D illustrates various examples of UAV systems according to embodiments of the present disclosure.
Figure 4B:
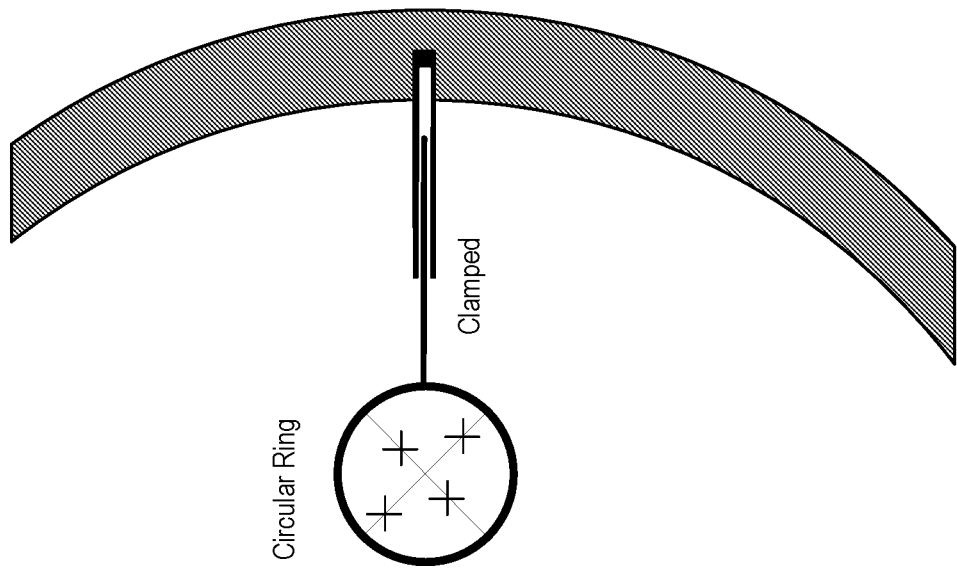

The inner-outer connection is designed to link a non-leaf cell i∈$V_F$ to the out-neighbor cell j∈$O_i$ through a reciprocal link, as illustrated in FIGS. 4A and 4B. When cell i∈$V_F$ encloses three or six cells, specified by $O_i$, all reciprocal links roll on the outer rails of the cells defined by $O_i$ (as illustrated FIGS. 4A and 1A). If the non-leaf cell i∈$V_F$ encloses two out-neighbor cells, defined by $O_i$={j, h}, one reciprocal link is clamped on the outer rail of cell j∈$O_i$ (as illustrated in FIGS. 1B and 4B), while the other one rolls on the outer rail of cell h E $O_i$ (see FIG. 4A).

Design Constraints

The following constraints may be used to design the inter-connection between two circular guides or two circular tubes:

Constraint 1: One Clamped Bar per cell: Only one bar can be clamped on the outer rail of a cell. The remaining connected bars must all roll on the outer rail of the cell. We note that a cell cannot freely move, if it is connected to more than one clamped bar. By satisfying this constraint, a cell can only enclose one, two, three, or six quadcopters (or other cells), as illustrated in FIGS. 2A-2D.

Figure 4C:
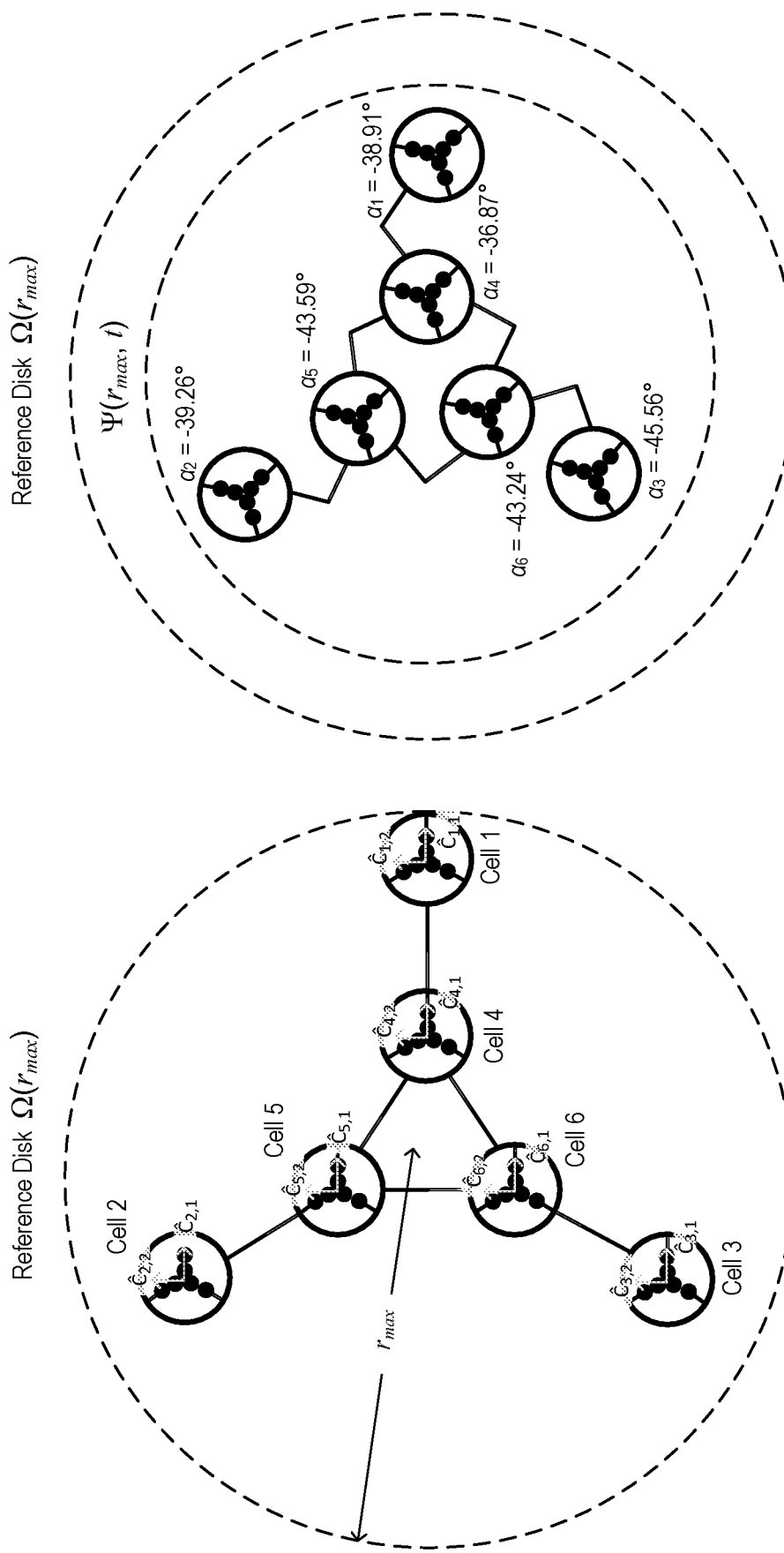

Constraint 2: Clockwise Rotation of the Leader Cells: The CD rotation angle $\alpha_i$ is non-positive for every cell i∈$V_F$ as all clamped bars are constrained to rotate in the clockwise direction with respect to their reference configurations (see FIG. 4B). This geometric constraint may be imposed to avoid collision between the links connecting the interior cells 4, 5, and 6. As in FIG. 4C, the UAV SYSTEM safely deforms when CD rotation angles are all negative.

Constraint 3: Mechanical Design Constraints: It is desired that the UAV SYSTEM design generates high thrust-to-weight and strength-to-weight ratios, and is enabled to effectively deform and reconfigure. For example, if the UAV SYSTEM is a small unmanned aircraft systems (UAS), its weight with payload (not shown) may be limited to 55 lb (25 kg) according to the Part 107 of the Federal Aviation Administration (FAA) regulations. Under this assumption, the UAV SYSTEM is designed such that each cell encloses up to three quadcopters, and the total vehicle weight does not exceed 12 kg. Thus, the quadcopters motors have a net thrust that can carry at least 13 kg payload in an aerial transport mission. The structural components of the UAV SYSTEM may be designed using, for example, fundamental principles of strain and stress field analysis, such that high strength-to-weight ratios are obtained. Furthermore, the lengths of the connecting bars, the quadcopter size, radii of circular guides and cells may be designed, as described herein, such that the connecting bars do not collide as a result of aggressive continuum deformation of the UAV SYSTEM.

Kinematics of the UAV SYSTEM

Figure 4D:
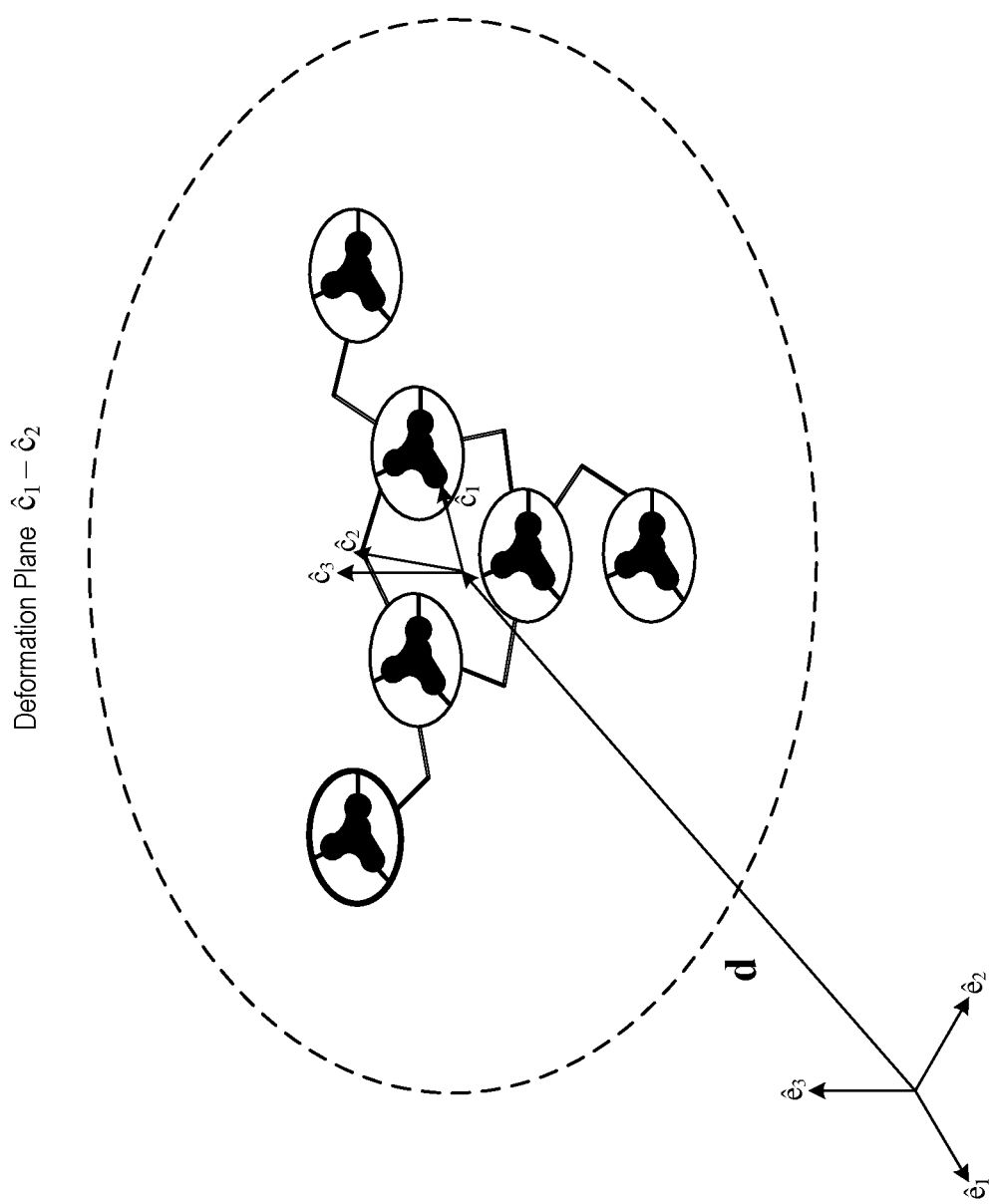

To obtain the kinematics of the UAV SYSTEM, a global coordinate system may be used with base vectors ($\hat{e}_1$, $\hat{e}_2$, $\hat{e}_3$) fixed on the ground. The local coordinate system may also be fixed at the center of the root cell 0∈$V_F$. The base vectors of the local coordinate system are denoted by ($\hat{c}_1$, $\hat{c}_2$, $\hat{c}_3$) and related to ($\hat{e}_1$, $\hat{e}_2$, $\hat{e}_3$) by:

$$\hat{c}_h = S(t)\hat{e}_h, h = 1, 2, 3,$$

where S(t) is an orthogonal matrix characterizing rotation of the UAV SYSTEM with respect to the inertial frame. The origin of the local coordinate system is positioned at d(t)= $d_x(t)\hat{e}_1+d_y(t)\hat{e}_2+d_z(t)\hat{e}_2$ with respect to the inertial coordinate system (see FIG. 4D). The UAV SYSTEM cells are all distributed in the $\hat{c}_1$-$\hat{c}_2$ plane.

To specify deformation of the UAV SYSTEM, we define a reference for $r_{i,0}=[u_{i,0}\ v_{i,0}\ w_{i,0}]^T$ with respect to the center of cell $j \in V$ for every out-neighbor cell $i \in O_j$. Note that $r_{i,0}$ can be specified based on the length $L_i$ and radius $R_i$. The desired position of the center of the cell $i \in V \backslash \{0\}$ is denoted by $a_i(t)$ and defined by $$a_i(t) = Q_j r_{i,0} + a_j(t),$$

where $i \in O_j$, and $j \in V$. Jacobian matrices $Q_0, \ldots, Q_M$ are all planned so that the quadcopter team continuum deformation coordination satisfies the safety requirements, and the best stability condition is achieved when the UAV SYSTEM coordinates under adverse weather condition. For every leaf cell $i \in V_L$, $Q_i = I_3$ is an identity matrix and $r_{i,0} = 0$ since every leaf cell encloses a single quadcopter sliding along the inner rail of the leaf cell. However, every quadcopter $i \in V_L$, generates control force $F_i$ and control moment $M_i$ as shown in FIG. 3A.

Safety Specification

We will formally characterize safety and specify structural collision avoidance conditions using eigen-decomposition of matrices $Q_0, Q_{N+1}, \ldots, Q_M$. Matrix $Q_M$ is nonsingular and defined by $$Q_j(t) = \begin{bmatrix} aj(t) & bj(t) & 0 \\ cj(t) & dj(t & 0 \\ 0 & 0 & 1 \end{bmatrix}, j \in V \backslash V_L.$$

If cell $j \in V_F$ encloses two out-neighbor cells, defined by $O_j$, then, $b_j(t) = c_j(t) = 0$, $d_j(t) = 1$, and $a_j(t) \in (0, 1]$ can be uniquely determined based on the local desired positions the two cells enclosed by $j \in V_F$. When cell $j \in V_F$ encloses three or six out-neighbor cells, $a_j$, $b_j$, $c_j$, and $d_j$ are uniquely related based on the local desired positions of the three out-neighbor cells that are directly connected to cell $j \in V_F$.

In some embodiments, look-up tables may be used to assign the maximum number of quadcopters that can be contained by every cell $j \in V_F$. To this end, by applying the principles of continuum mechanics, a positive-definite strain matrix may be defined as:

$$U_j(t) = \left(Q_j^T(t) Q_j(t)\right)^{1/2}, j \in V \backslash V_L$$

and obtain collision avoidance guarantee condition by constraining the lower bound for the eigenvalues of matrix $U_j(t)$ at any time t.

Equation of Motion

Because the quadcopter arms directed along $\hat{i}_i$ are constrained to slide along the inner rail of leaf cell $i \in V_L$, the pitch angle of quadcopter $i \in V_L$ is always 0. However, the roll and yaw of every quadcopter $i \in V_L$ are free, and thus, every quadcopter $i \in V_L$ can act as a gyroscope providing a control force in an arbitrary direction. The dynamics of the UAV SYSTEM is over-actuated because each multi-copter $i \in V_L$ can provide actuation inputs, assigned by control force vector Fi and control moment vector Mi, to stably track the UAV SYSTEM desired trajectory and orientation. Specifically, a UAV SYSTEM with healthy actuators and sensors can carry external load $F_0$ and external moment $M_0$ while it provides 4N control inputs to control global position of the UAV SYSTEM denoted by d(t), velocity $\dot{d}(t)$, orientation of the UAV SYSTEM characterized by rotation matrix S(t), and the angular velocity of the UAV SYSTEM. Therefore, the UAV can function under safe operational conditions as well as anomalous situations where it has the capability of executing appropriate safety-recovery controls. The Lagrange method may be used to obtain the translational and rotational dynamics of the configurable UAV.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. An unmanned vehicle system, comprising:
   a first non-terminal cell enclosing a first plurality of terminal cells, each of the first plurality of terminal cells enclosing a respective unmanned arial vehicle (UAV);
   a second non-terminal cell enclosing a second plurality of terminal cells, each of the second plurality of terminal cells enclosing a respective UAV;
   a first non-terminal cell linkage member fixedly coupled to the first non-terminal cell;
   a second non-terminal cell linkage member movably coupled to the second non-terminal cell; and
   a non-terminal cell pivot joint to pivotally couple the first and second non-terminal cell linkage members;
   wherein the first and second non-terminal cells are arranged in a single plane, and first and second non-terminal cell linkage members and the non-terminal cell pivot joint provide controllable movement of the first and second non-terminal cells with respect to one another and within the single plane.

2. The unmanned vehicle system of claim 1, wherein the first and second non-terminal cells and the first and second non-terminal cell linkage members and the non-terminal cell pivot joint having a rigidity to maintain the first and second non-terminal cells and the first and second non-terminal cell linkage members substantially in the single plane.

3. The unmanned vehicle system of claim 1, further comprising a non-terminal cell movable coupling member to movably couple the second non-terminal cell linkage member to the second non-terminal cell; wherein the second non-terminal cell comprising a ring member having an outer slot defined therein and wherein the non-terminal cell movable coupling member to engage the outer slot to enable the second non-terminal cell to rotate with respect to the second non-terminal cell linkage member and with the single plane.

4. The unmanned vehicle system of claim 1, wherein the first plurality of terminal cells include at least a first terminal cell and a second terminal cell; the structure further comprising:
a first terminal cell linkage member fixedly coupled to the first terminal cell;
a second terminal cell linkage member movably coupled to the second terminal cell; and
a terminal cell pivot joint to pivotally couple the first and second terminal cell linkage members;
wherein the first and second terminal cells are arranged in the single plane, and the first and second terminal cell linkage members and the terminal cell pivot joint provide controllable movement of the first and second terminal cells with respect to one another and within the single plane.

5. The unmanned vehicle system of claim 4, wherein the first and second terminal cells and the first and second terminal cell linkage members and the terminal cell pivot having a rigidity to maintain the first and second terminal cells and the first and second terminal cell linkage members substantially in the single plane.

6. The unmanned vehicle system of claim 4, further comprising a terminal cell movable coupling member to movably couple the second terminal cell linkage member to the second terminal cell; wherein the second terminal cell comprising a ring member having an outer slot defined therein and wherein the terminal cell movable coupling member to engage the outer slot to enable the second terminal cell to rotate with respect to the second terminal cell linkage member and with the single plane.

7. The unmanned vehicle system of claim 4, further comprising a first interface coupling member to couple the first terminal cell to the first non-terminal cell within the single plane, and a second interface coupling member to couple the second terminal cell to the first non-terminal cell within the single plane.

8. The unmanned vehicle system of claim 4, wherein the second terminal cell comprising a ring member having an inner slot defined therein; and further comprising first and second pivoting coupling members to couple a UAV within the second terminal cell; wherein the first and second pivoting coupling members to engage the inner slot to enable the UAV to rotate with respect to the second terminal cell and with the single plane; and wherein the first and second pivoting coupling members enable the UAV to pivot with respect to the single plane and to rotate within the second terminal cell.

9. The unmanned vehicle system of claim 1, wherein at least one of the UAVs is selected from the group comprising a quadcopter, a tri-copter, a bi-copter, and/or a single rotor copter.

10. The unmanned vehicle system of claim 1, wherein the first terminal cell encloses 2, 3 or 6 of the first plurality of non-terminal cells; and wherein the second terminal cell encloses 2, 3 or 6 of the second plurality of non-terminal cells.

11. An unmanned vehicle system, comprising:
a first non-terminal cell enclosing a first plurality of terminal cells, each of the first plurality of terminal cells enclosing a respective unmanned arial vehicle (UAV);
a second non-terminal cell enclosing a second plurality of terminal cells, each of the second plurality of terminal cells enclosing a respective UAV;
a first non-terminal cell linkage member fixedly coupled to the first non-terminal cell;
a second non-terminal cell linkage member movably coupled to the second non-terminal cell; and
a non-terminal cell pivot joint to pivotally couple the first and second non-terminal cell linkage members;
wherein the first and second non-terminal cells are arranged in a single plane, and first and second non-terminal cell linkage members and the non-terminal cell pivot joint provide controllable movement of the first and second non-terminal cells with respect to one another and within the single plane; and wherein the first terminal cell encloses 2, 3 or 6 of the first plurality of non-terminal cells; and wherein the second terminal cell encloses 2, 3 or 6 of the second plurality of non-terminal cells.

12. The unmanned vehicle system of claim 11, wherein the first and second non-terminal cells and the first and second non-terminal cell linkage members and the non-terminal cell pivot joint having a rigidity to maintain the first and second non-terminal cells and the first and second non-terminal cell linkage members substantially in the single plane.

13. The unmanned vehicle system of claim 11, further comprising a non-terminal cell movable coupling member to movably couple the second non-terminal cell linkage member to the second non-terminal cell, the non-terminal cell movable coupling member including at least one roller mechanism; wherein the second non-terminal cell comprising a ring member having an outer slot defined therein and wherein the roller member to engage the outer slot to enable the second non-terminal cell to rotate with respect to the second non-terminal cell linkage member and with the single plane.

14. The unmanned vehicle system of claim 11, wherein the first plurality of terminal cells include at least a first terminal cell and a second terminal cell; the structure further comprising:
a first terminal cell linkage member fixedly coupled to the first terminal cell;
a second terminal cell linkage member movably coupled to the second terminal cell; and
a terminal cell pivot joint to pivotally couple the first and second terminal cell linkage members;
wherein the first and second terminal cells are arranged in the single plane, and the first and second terminal cell linkage members and the terminal cell pivot joint provide controllable movement of the first and second terminal cells with respect to one another and within the single plane.

15. The unmanned vehicle system of claim 14, wherein the first and second terminal cells and the first and second terminal cell linkage members and the terminal cell pivot joint having a rigidity to maintain the first and second terminal cells and the first and second terminal cell linkage members substantially in the single plane.

16. The unmanned vehicle system of claim 14, further comprising a terminal cell movable coupling member to movably couple the second terminal cell linkage member to the second terminal cell, the terminal cell movable coupling member including at least one roller mechanism; wherein the second terminal cell comprising a ring member having an outer slot defined therein and wherein the roller member to engage the outer slot to enable the second terminal cell to rotate with respect to the second terminal cell linkage member and with the single plane.

17. The unmanned vehicle system of claim 14, further comprising a first interface coupling member to couple the first terminal cell to the first non-terminal cell within the single plane, and a second interface coupling member to couple the second terminal cell to the first non-terminal cell within the single plane.

18. The unmanned vehicle system of claim 14, wherein the second terminal cell comprising a ring member having an inner slot defined therein; and further comprising first and second pivoting coupling members to couple a UAV within the second terminal cell; wherein the first and second pivoting coupling members to engage the inner slot to enable the UAV to rotate with respect to the second terminal cell and with the single plane; and wherein the first and second pivoting coupling members enable the UAV to pivot with respect to the single plane and to rotate within the second terminal cell.

19. The unmanned vehicle system of claim 11, wherein at least one of the UAVs is selected from the group comprising a quadcopter, a tri-copter, a bi-copter, and/or a single rotor copter.

* * * * *